May 10, 1966     S. V. WILSON     3,250,561
DUAL USE FOOD TURNER
Filed July 13, 1964
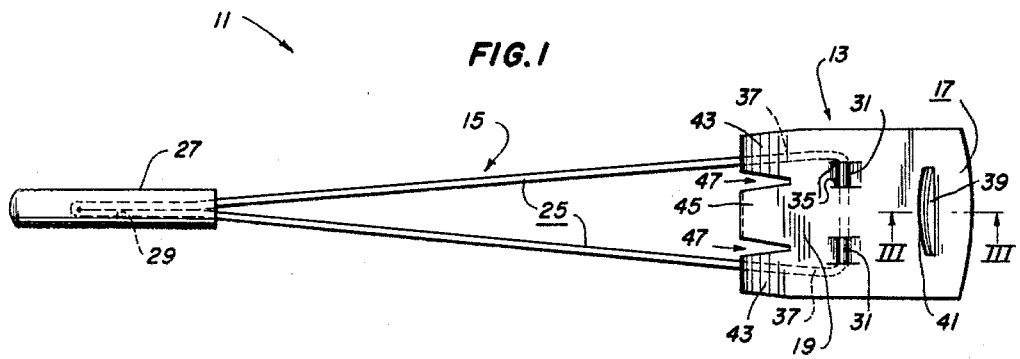
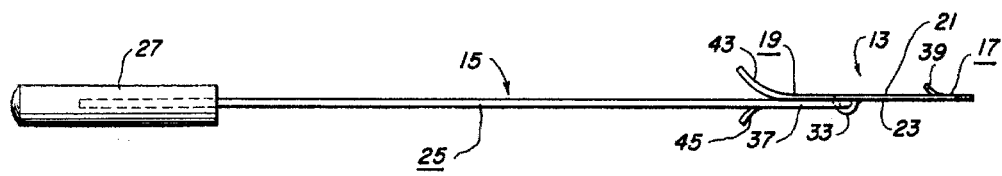
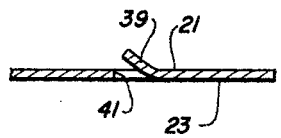
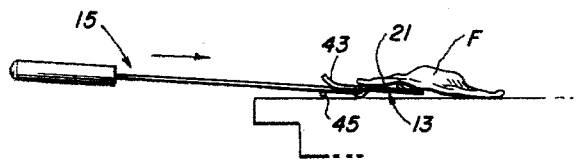
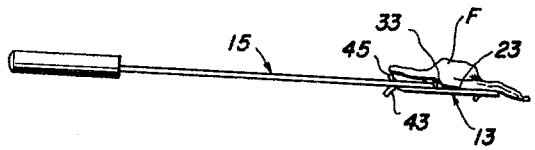
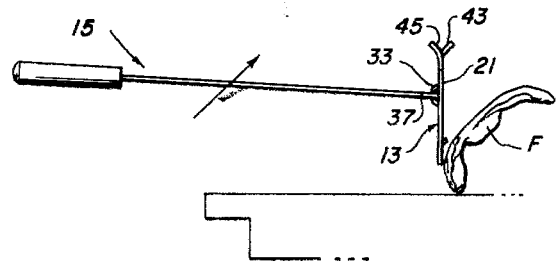
INVENTOR.
STACY V. WILSON
BY John R. Walker, III
Attorney

United States Patent Office 3,250,561
Patented May 10, 1966

3,250,561
DUAL USE FOOD TURNER
Stacy V. Wilson, 3389 Highland Park Place,
Memphis, Tenn.
Filed July 13, 1964, Ser. No. 382,064
4 Claims. (Cl. 294—7)

The present invention relates to substantially small hand-operable food turners for overturning eggs, pancakes, hamburgers, and other such food items as they are being cooked. Particularly, the present invention concerns a versatile food turning device which may be used in two ways. The device of the present invention includes a thin, flat pivotable blade. When the blade is positioned with one surface thereof facing upwardly, the device may be used to overturn the food item, and when the device is inverted and the other surface of the blade is facing upwardly, the device may be used for supporting or transferring the food item from one place to another.

One of the objects of the present invention is to provide a food turner specially suited for use in restaurants, cafeterias, or other such places where a considerably large quantity of food is prepared and where the expeditious preparation of the food is desirable.

A further object is to provide a food turner which pivotally overturns the eggs or the like in a direction away from the user, thus eliminating substantially the likelihood of burns to the user from hot grease splashed from the stove or cooking surface.

A further object is to provide a food turner having a substantially long handle for the easy manipulation of food items that may be disposed at some distance from the user and such items that may be at the back part of the stove top.

A further object is to provide a food turner which is easy to use and such that requires only negligible skill or practice for the user to become proficient in its use.

A further object is to provide a food turner readily operable for gently turning an egg, thus eliminating substantially the likelihood of breaking the egg yolk.

A further object is to provide a food turner of such simple design as to be easily kept clean and to be readily manufactured and marketed.

A further object is generally to improve the design and construction of food turners.

The means by which the foregoing and other objects of the present invention are accomplished and the manner of their accomplishment will be readily understood from the following specification upon reference to the accompanying drawings, in which:

FIG. 1 is a plan view of the device as viewed from the obverse side thereof.

FIG. 2 is a side elevational view.

FIG. 3 is a longitudinal sectional view taken as on the line III—III of FIG. 1.

FIGS. 4 and 5 illustrate the manipulation of the device in overturning an egg or the like.

FIG. 6 illustrates the device as in use in transferring an egg or the like.

Referring now to the drawings in which the various parts are indicated by reference characters, the food turning device is indicated by the numeral 11, and the egg or other like food item is indicated by the letter F.

Device 11 includes principally a thin, flat blade 13 and handle means, indicated generally as at 15. Blade 13 is preferably of thin and tempered steel and is resiliently flexible. Blade 13 is of a size suitable for underlying and supporting the desired food item and includes a forward edge portion 17, a rearward edge portion 19, an obverse side surface 21, and a reverse side surface 23.

Handle means 15 includes elongated shank means and a handle 27. The shank means is preferably formed of a length of wire of suitable cross-section which is bent to establish a pair of legs 25. Handle 27 is cylindrical and preferably formed of wood or plastic and is provided with an axially aligned bore opening 29. Legs 25 are preferably formed by bending the wire length in the center portion thereof and frictionally fitting this portion in bore opening 29 of handle 27.

Blade 13 and handle means 15 are pivotally connected, and this connection preferably is as follows: The ends of each of legs 25 are right-angularly bent to provide transverse portions 31. Portions 31 of each leg 25 are in confronting relationship and are in axial alignment. A pair of lobe-like projections 33 are formed along reverse side 23 of blade 13 and pivotally receive respectively the transverse portions 31 of legs 25. The pair of lobe-like projections 33 are preferably formed by slitting blade 13 at four transversely aligned and parallel slits 35 and deforming the metal outwardly from reverse side surface 23. The placement of projections 33 relative to the length of blade 13 should be such that the pivot axis is rearwardly of the transversely disposed center of gravity of blade 13, and when held in a substantially flat and horizontal position, that portion of the blade forward of the pivot axis should be somewhat heavier than that portion to the rear of the pivot axis. Thus, when the device is supported by handle 27 with the obverse side surface 21 facing upwardly, blade 13 will be pivoted to a substantially vertical position, as shown in FIG. 5, and, by the same token, when the device is held with reverse side surface 23 facing upwardly, the blade will be pivoted under the force of gravity to a stopped and substantially horizontal position, as shown in FIG. 6. The device is thus usable with either the obverse side surface or the reverse side surface of the blade facing upwardly. With the obverse side surface 21 of blade 13 facing upwardly, the device is used for overturning the food item, as illustrated in FIGS. 4 and 5. With the reverse side surface 23 of blade 13 facing upwardly, the device may be used for supporting or transferring the food item from one place to another, as illustrated in FIG. 6. It will be noted that stop means are provided for limiting the relative pivotal movement of blade 13 and handle means 15 and is operative when the device is being used as illustrated in FIG. 6. The reverse side surface 23 of rearward edge portion 19 abuttingly engages respectively the portions 37 of legs 25. The pivot axis and the arrangement of legs 25 and blade 13 are preferably such that when the device is in a stopped position, legs 25 and reverse side surface 23 of blade 13 are in substantially parallel and abutting engagement.

Arresting means is preferably provided in blade 13 for arresting somewhat the sliding movement of the egg or like food item along the obverse side surface 21 of blade 13, that is, in certain applications of the device, particularly when it is used in the turning or manipulation of fried eggs, it is desirable that the forward movement of the food item be arrested or retarded somewhat. The arresting means of the present invention consist principally of a sprag-like or angular portion 39 projecting rearwardly and obliquely from obverse side surface 21. Portion 39 is integrally formed of forward edge portion 17 of blade 13, and a cross-section thereof is illustrated in FIG. 3. The preferred manner of forming portion 39 preferably includes providing an arc-shaped slit 41 extending transversely of blade 13, and deforming the metal along the chord of the arc of the slit in an angular bend to provide portion 39.

Blade positioning means is preferably provided for positioning the angle of blade 13 relative to the stove top or cooking surface. The blade positioning means is preferably integrally formed of the rearward edge portion 19 of blade 13 and includes oppositely extending tab-like portions 43, 45 extending respectively from the obverse side surface 21 and the reverse side surface 23 of the blade. Two tab-like portions 43 extend from obverse side surface 21, and one tab-like portion 45 extends from reverse side surface 23. The manner of forming portions 43, 45 preferably includes providing a pair of V-shaped slots 47 in rearward edge portion 19 of blade 13, and bending the two portions 43 and the single portion 45 substantially in equal amounts and in opposite directions. Portions 43, 45 position blade 13 at an optimum angle relative to the stove top for the easy manipulation of the blade under the egg or like food item. Thus, whether the device is being used to turn or to transfer the food item, the blade 13 will be positioned so as to slide under the food item readily.

It is thought that the functional advantages and operation of food turning device 11 have become fully apparent from the foregoing detailed description of parts; however, for completeness of disclosure, the manner of usage will be briefly described.

FIGS. 4 and 5 illustrate generally the two essential steps in overturning an egg or like food item F. The arrows in FIGS. 4 and 5 indicate the direction of movement for the handle means of the device. FIG. 4 illustrates the initial step and shows the blade of the device being slipped under the food item. FIG. 5 illustrates the second step in which the handle and shank means of the device is moved upwardly and outwardly, and shows the blade pivoting downwardly and the egg or food item being overturned. After the egg or like food item is cooked, and it is desired to remove it from the stove or cooking surface, the device is inverted, and the blade pivots to a stopped and substantially horizontal position with the reverse side surface facing upwardly, as shown in FIG. 6. The device disposed thus may be readily manipulated to slide the blade under and transfer the food item from the stove to such a receptacle as may be provided therefor.

The food turning device of the present invention is substantially simple and easy to use. It may be safely used; the hazard or the likelihood of the user being burned by splashed hot grease is substantially eliminated since, in overturning a food item, it is pivotally overturned in a direction away from the user. The device is particularly suited for overturning fried eggs since it may be manipulated to gently overturn the egg and thus reduce considerably the likelihood of breaking the egg yolk. The food turner is quickly operable and thus provides a very practical tool for use in cafeterias, restaurants, or such other places where large quantities of food are prepared and where expeditious preparation of the food is desirable.

Although the invention has been described and illustrated with respect to a preferred embodiment thereof, it is not to be so limited since changes and modifications may be made therein which are within the full intended scope of this invention as hereinafter claimed.

I claim:

1. A dual use device for turning or manipulating fried eggs or other like food items comprising a substantially thin flat blade of a size suitable for underlying and supporting the food item and having a forward edge portion and a rearward edge portion and an obverse side surface and a reverse side surface, handle means including elongated shank means, pivot means pivotally connecting said shank means and said blade with the pivot axis thereof being intermediate said forward edge portion and said rearward edge portion, stop means unidirectionally operative solely for stopping in one direction only the pivotal movement of said blade relative to said shank means, said blade including arresting means for arresting substantially the sliding movement of the food item along said obverse side surface of said blade, said arresting means including means substantially unidirectionally operative for arresting substantially the forward movement only of said food item relative to said blade, said device being adapted to be operatively supported by said handle means with either said obverse side surface or said reverse side surface of said blade facing upwardly; when said device is supported with said obverse side surface of said blade facing upwardly, said blade being pivoted under the force of gravity to a free swinging and substantially vertical disposition, and when said device is supported with said reverse side surface of said blade facing upwardly, said blade being pivoted under the force of gravity to a stopped and essentially horizontal disposition.

2. The device of claim 1 in which said arresting means is integrally formed of said blade and includes a rearwardly extending sprag-like portion projecting obliquely from said obverse side surface.

3. A dual use device for turning or manipulating fried eggs or other like food items on a cooking surface comprising a substantially thin flat blade of a size suitable for underlying and supporting the food item and having a forward edge portion and a rearward edge portion and an obverse side surface and a reverse side surface, handle means including elongated shank means, pivot means pivotally connecting said shank means and said blade with the pivot axis thereof being intermediate said forward edge portion and said rearward edge portion, means for stopping the pivotal movement of said blade relative to shaid shank means, and blade positioning means spaced from said pivot means and secured to said rearward edge portion of said blade and operatively engageable with said cooking surface for positioning the angle of said blade relative to said cooking surface.

4. The device of claim 3 in which said blade positioning means is integrally formed of said rearward edge portion of said blade and includes oppositely extending portions extending respectively from said obverse side surface and said reverse side surface.

References Cited by the Examiner

UNITED STATES PATENTS

| | | | |
|---|---|---|---|
| 589,753 | 9/1897 | Ramey et al. | 294—7 |
| 627,536 | 6/1899 | Schultz | 294—8 |
| 2,025,678 | 12/1935 | Brandy | 294—49 |

HUGO O. SCHULZ, *Primary Examiner.*

GERALD M. FORLENZA, *Examiner.*

A. GRANT, *Assistant Examiner.*